(12) United States Patent
Gau

(10) Patent No.: US 7,613,013 B2
(45) Date of Patent: Nov. 3, 2009

(54) MOUNTING MEANS FOR A SENSOR DEVICE

(75) Inventor: Harry Gau, Ingbert (DE)

(73) Assignee: Decoma (Germany) GmbH, Sulzbach (DE)

( * ) Notice: Subject to any disclaimer, the term of this patent is extended or adjusted under 35 U.S.C. 154(b) by 649 days.

(21) Appl. No.: 11/110,218

(22) Filed: Apr. 20, 2005

(65) Prior Publication Data
US 2005/0230581 A1 Oct. 20, 2005

(30) Foreign Application Priority Data
Apr. 20, 2004 (DE) .................. 10 2004 021 005

(51) Int. Cl.
H05K 7/02 (2006.01)
H05K 7/04 (2006.01)
(52) U.S. Cl. .................... 361/810; 361/807
(58) Field of Classification Search ............... 361/810, 361/807, 801, 802
See application file for complete search history.

(56) References Cited
U.S. PATENT DOCUMENTS 5,661,890 A * 9/1997 Pfaffenberger ............. 29/426.6
6,203,366 B1 * 3/2001 Muller et al. ............... 439/561
6,282,969 B1 * 9/2001 Daniel ........................ 73/866.1
6,581,484 B1 * 6/2003 Schuler .................... 73/866.5

FOREIGN PATENT DOCUMENTS

| DE | 38 12 182 A1 | 10/1989 |
| DE | 196 26 291 A1 | 1/1998 |
| DE | 197 19 519 A1 | 11/1998 |
| DE | 199 24 505 B4 | 11/2000 |
| DE | 199 43 293 C2 | 2/2002 |

\* cited by examiner

Primary Examiner—Hung S Bui
(74) Attorney, Agent, or Firm—Clark Hill PLC

(57) ABSTRACT

A retaining device for a sensor is mounted on a part having an opening, in particular, on an outer part of a motor vehicle. The retaining device includes an endplate attachable to an inner surface of the part and having an opening. The retaining device also includes a housing adjacent to the endplate for receiving at least part of the sensor. An additional member is mounted inside the opening in the endplate and includes a projection projecting outwards from the endplate. The additional member can be brought into engagement with the opening in the part such that the opening in the endplate is centrally aligned with respect to the opening in the part.

18 Claims, 3 Drawing Sheets

MOUNTING MEANS FOR A SENSOR DEVICE

FIELD OF THE INVENTION

The invention relates to a retaining device for a sensor for mounting on a part, having an opening, and a method of mounting a sensor on such a part.

DESCRIPTION OF RELATED ART

In motor vehicle construction, numerous sensors for all kinds of applications are mounted in or on a vehicle body using suitable retaining devices. Systems for determining the distance from other vehicles, which are known for example as Parktronic Systems, generally use ultrasonic sensors that are attached by suitable holders in or on an opening in a bumper.

It is conventional when mounting an ultrasonic sensor on the bumper to attach a retaining device in which the sensor can be held on the reverse of an inner surface of the bumper. For this purpose, the retaining device has an endplate provided with adhesive which is stuck to the inner surface of the bumper. However, before the adhesive on the endplate is brought into contact with the inner surface of the bumper, it is essential to use a centering rod or similar aid for aligning the retaining device with an opening in the bumper as desired. If the centering rod is handled clumsily, the retaining device is not properly centered on the bumper, which means that if the adhesive has already cured too much, the entire bumper has to be discarded at considerable expense. Moreover, the quality of manual attachment of the retaining device on the inside of the bumper in this way is always dependent on the skill of the operator.

DE 38 12 182 A1 discloses a housing for securing an ultrasonic transducer on a bumper, the housing accommodating the ultrasonic transducer. The housing is inserted in an opening in the bumper from the outside of the bumper and is supported by an encircling flange on the bumper. The housing is attached to the bumper at a lower end by means of a push-in connection and at a top portion by means of a spring-like fixing member. However, this arrangement of the ultrasonic transducer is disadvantageous in that relatively large housings or openings have to be provided on the bumper to accommodate the ultrasonic transducer, which take up a comparatively large amount of space and may conflict with the design specification because of their size.

DE 199 43 293 discloses a retaining device for an ultrasonic transducer on an outer part of a motor vehicle including a holding plate with a receiving portion in the manner of a hollow body, and an adaptor. The receiving portion in the manner of a hollow body is formed on a surface of the outer part of the motor vehicle. The adaptor, which holds the ultrasonic transducer on an outer part of a motor vehicle, is disadvantageous in that to fit the adaptor, the holding plate must first be shaped to fit a surface of the outer part, thereby increasing the cost of such an outer part.

The invention allows a sensor to be mounted on a part with an opening, particularly an outer part of a motor vehicle, with less effort and with greater precision with regard to the opening in the part.

SUMMARY OF THE INVENTION

By the retaining device according to the invention, a sensor, particularly an ultrasonic sensor, a radar sensor or the like, can advantageously be mounted on an inner surface of a part relative to an opening formed therein such that an edge portion of an end face of the sensor, which faces the part, is located at a precisely uniform spacing from an edge portion of the opening provided in the part. This is achieved by providing an additional member inside an opening in an endplate of the retaining device, the projection of which, projecting outwards from the endplate, is designed so that its outer contour matches the inner contour of the opening provided in the part. As a result, when the endplate is secured to an inner surface of the part, the projection engages in the opening in the part while the opening in the endplate is aligned centrally with respect to the opening in the part.

The additional member may be mounted inside the opening in the endplate by releasable securing means. Expediently, securing means of this kind may be formed by a film hinge or the like, in the case of a retaining device made of plastic. When the endplate of the retaining device is secured to the inner surface of the part, the additional member, after performing its function of centering the opening of the endplate relative to the opening in the part, can easily be removed from the retaining device by breaking off the film hinges, so that the sensor can then be inserted in the retaining device.

The means for fixing the sensor in the housing may be formed by a releasable latching connection. For securing purposes, at least one latching lug may be formed on a body of the sensor, the lug engaging behind the latching connection when the sensor is secured in the housing. The latching connection ensures that the sensor is positioned in the housing of the retaining device by a very simple design and, in particular, reliably, the fixing of the sensor in the housing being carried out after the sensor has been pushed in simply by latching the latching lug to the latching connection, e.g., formed by a snap-fit hook or the like.

The housing of the retaining device is expediently of such dimension that, after being fixed in the housing with an end face facing the part, the sensor is substantially flush with an outer surface of the part. Moreover, the retaining device is secured to the part due to the cooperation of the additional member with the opening in the part during fixing of the endplate to the inner surface of the part, such that an edge of the end face of the sensor facing the part, when the sensor is secured in the housing, is at a uniform spacing, with a very small gap, from an edge of the opening of the part. The above-described effects on the one hand contribute greatly to an optically satisfactory appearance of the part viewed from the outside. On the other hand, the uniform spacing of the sensor from the opening provided in the part ensures that the sensor is always located centrally so that it does not hit the actual part and thereby interfere with its operation.

The fixing of the endplate on the inner surface of the part can be done, for example, either by adhesive bonding or by welding. For adhesive bonding, an adhesive layer in the form of an adhesive film, for example, is applied to a surface of the endplate so that the endplate is placed on the inner surface of the part and thereby adhered to it. In adhesive bonding, there is no introduction of heat into the components and, therefore, there is no undesirable heating or even melting of the plastics if the retaining device and the outer part of the vehicle are made of such material. Undesirable marking points at the places where the retaining device is secured to the opposite side of the part, which detract from the optical appearance of the outer part of the vehicle, are reliably prevented in this instance.

Further, the projection on the additional member may have a circular cross section to fit the opening in the part. For example, the projection may be in the form of an annular strip, which by virtue of its shape, can be inserted in a circular opening in the part so as to be automatically centered therein, thereby ensuring the centering of the endplate or the housing of the retaining device relative to the opening in the part.

A method according to the invention for mounting a sensor on a part having an opening, particularly an outer part of a motor vehicle, is characterized in that the retaining device according to the invention is secured by its endplate to an inner surface of the part with the projection of the additional member engaging in the opening, so that the opening in the endplate is aligned centrally with respect to the opening in the part. Once the endplate has been secured, the additional member is removed from the retaining device by undoing the fixing means, after which the sensor is at least partially inserted in the housing. The mounting of the sensor on the part is finished off by suitably fixing the sensor in the housing of the retaining device, e.g., by means of a latching connection in the form of a snap-in hook or the like.

The securing of the endplate to the inner surface of the part may suitably include adhesive bonding and/or welding of the endplate to the inner surface. Attaching the endplate purely by adhesive bonding has the considerable advantage that there is no danger of the fixing points showing through on the outside of the part. If, for example, an adhesive in the form of an adhesive tape or the like is used for the attachment, this tape being chosen in accordance with the nature of the material of the endplate and the inner surface of the part, strength values equal to those obtained by welding can be achieved by adhesive bonding.

The attachment of the endplate to the inner surface of the part as well as the removal of the additional member and/or the insertion or fixing of the sensor in the housing may advantageously be done by means of a robot device. In particular, when fixing the endplate to the inner surface of the part, it is very important that after the endplate has been put into position on the inner surface, the endplate is pressed against the part with sufficient and constant force for a pre-determined length of time, thereby achieving a considerable proportion of the final adhesive strength in only a short time. Purely by way of example, reference is made here to the use of conventional commercial adhesives with which 30% of the adhesive strength can be achieved after only 20 seconds pressure. No further pressure is then required as the adhesive continues to cure. The above-described pressure is ideal for use of a robot device, which presses the retaining device against the part in order to achieve an adhesive bond.

As an alternative to adhesion, if both the retaining device and the part are made from a thermoplastic material, the fixing of the endplate to the inner surface of the part can be done by ultrasonic welding. Ultrasonic welding of the kind needed to achieve controlled and constant bonds is preferably carried out using a robot device, in this case in the form of a welding robot.

Thus, the part on which the sensor is to be fixed does not require any further adaptation for later attachment of the sensor apart from the provision of an opening therein. The retaining device according to the invention is simply secured backwards, i.e., on the inner surface of the part then accommodates the sensor. The retaining device determines the position of the sensor and hence the gap, which is visible from outside, between one edge of the end face of the sensor visible from the outside and the edge of the opening formed in the part. The molded-on additional member inside the opening in the endplate ensures that the retaining device is centrally aligned with the opening in the endplate precisely in the desired manner and without any great complexity when securing the endplate to the inner surface of the part with the opening formed therein.

In addition to a clean and constant gap between the edge of the end face of the sensor and the edge of the opening formed in the part, clean abutment of a release ring of the sensor against the edge of the opening in part is ensured, thereby guaranteeing effective oscillation of the ultrasonic sensor.

As a result, the quality of mounting of the sensor on an outer part of a motor vehicle, for example, can be increased at very little cost and in a constantly reproducible manner.

BRIEF DESCRIPTION OF THE DRAWINGS

Advantages of the present invention will be readily appreciated as the same becomes better understood by reference to the following detailed description when considered in connection with the accompanying drawings wherein.

DETAILED DESCRIPTION OF PREFERRED EMBODIMENTS

Figure 1:
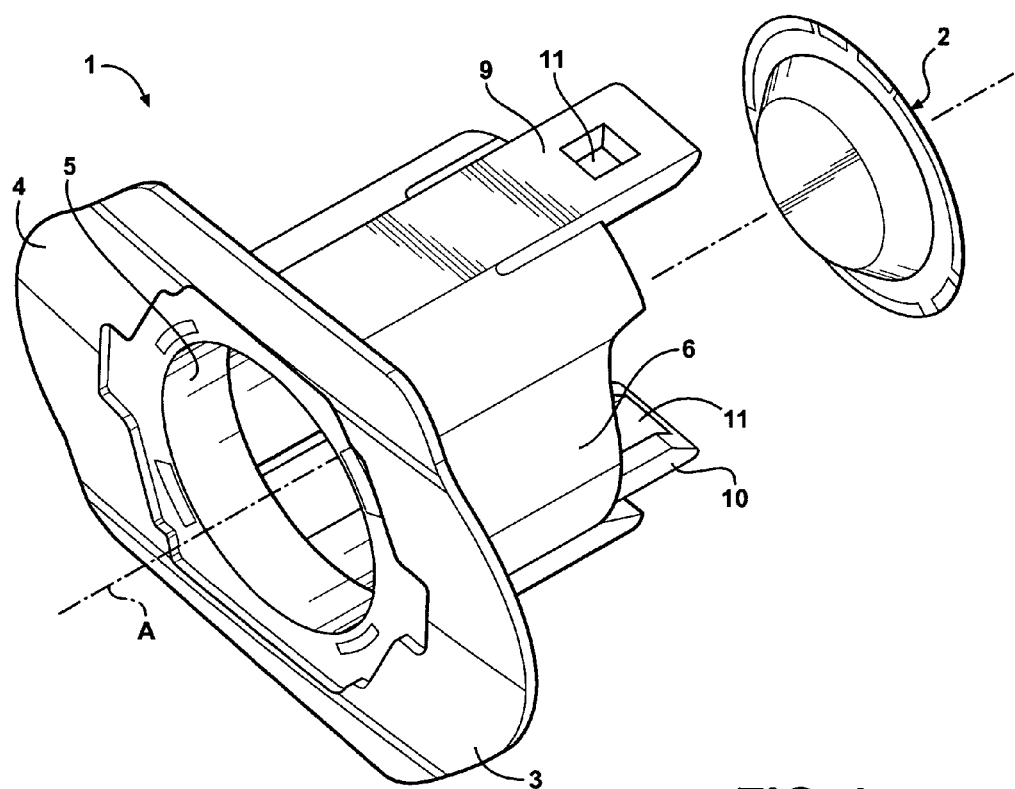
FIG. 1 is a perspective view of a retaining device according to the invention with an additional member shown separately therefrom.

Referring to FIG. 1, a retaining device 1 according to the invention is depicted along with an additional member 2. The retaining device 1 includes an endplate 3 with a front end face 4. An opening 5 is formed in a central region of the endplate 3. On a rear end face of the endplate 3, opposite the front end face 4, a housing 6 is formed around the opening 5. The housing 6 extends perpendicular to the plane of the endplate 3 away from the rear end face. In the embodiments shown, the housing 6 is circular and correspondingly the housing 6 has a circular cross-section.

The retaining device 1 is injection molded from a thermoplastic material, which results in reasonable manufacturing costs. An example of such a thermoplastic material is polyamide. However, any other suitable thermoplastic material may be used to produce the retaining device 1. Alternatively, it is also possible to make the retaining device 1 from a duromeric molding composition, e.g., a PUR system.

Figure 2:
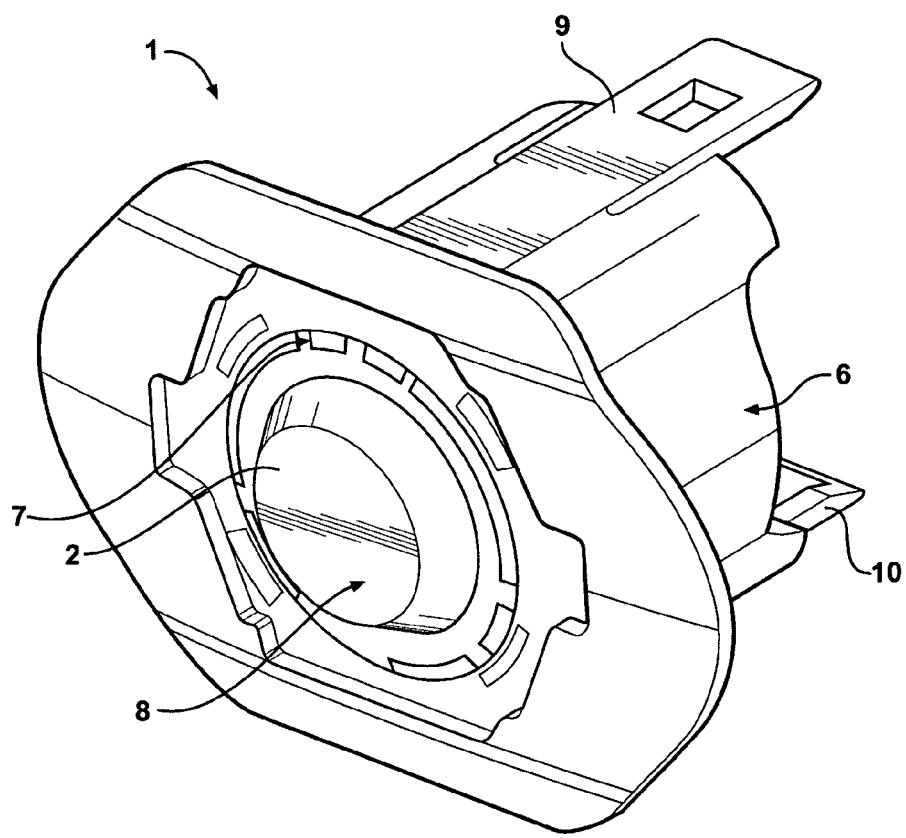
FIG. 2 is a perspective view of the retaining device, viewed from the endplate, with the additional member formed thereon.

The additional member 2 is formed on the retaining device 1 in the region of the opening 5. As shown in FIG. 2, the additional member 2 may be attached along one edge of the opening 5 by at least one or several film hinges 7. The additional member 2 has, in a central region thereof, a projection 8 that projects outwards from the plane of the endplate 3. The projection 8 may, for example, be in the form of an encircling annular strip or the like.

The housing 6 is open in construction in a region remote from the rear end face and is suitably dimensioned so that a commercial sensor, e.g., an ultrasonic sensor, can be inserted at the end removed from the open end. The housing 6 includes, in an edge portion thereof an upper latching strip 9 and a lower latching strip 10 both of which are resiliently movable along the longitudinal axis of the housing 6. On a free end of each of the upper 9 and lower 10 latching strips is formed a latching surface 11 that cooperate with a latching lug formed on a member of a sensor (not shown) once the sensor has been pushed far enough into the housing 6. As a result of the cooperation of the latching lug with the latching strips 9, 10, the sensor is secured in the housing 6.

Figure 3:
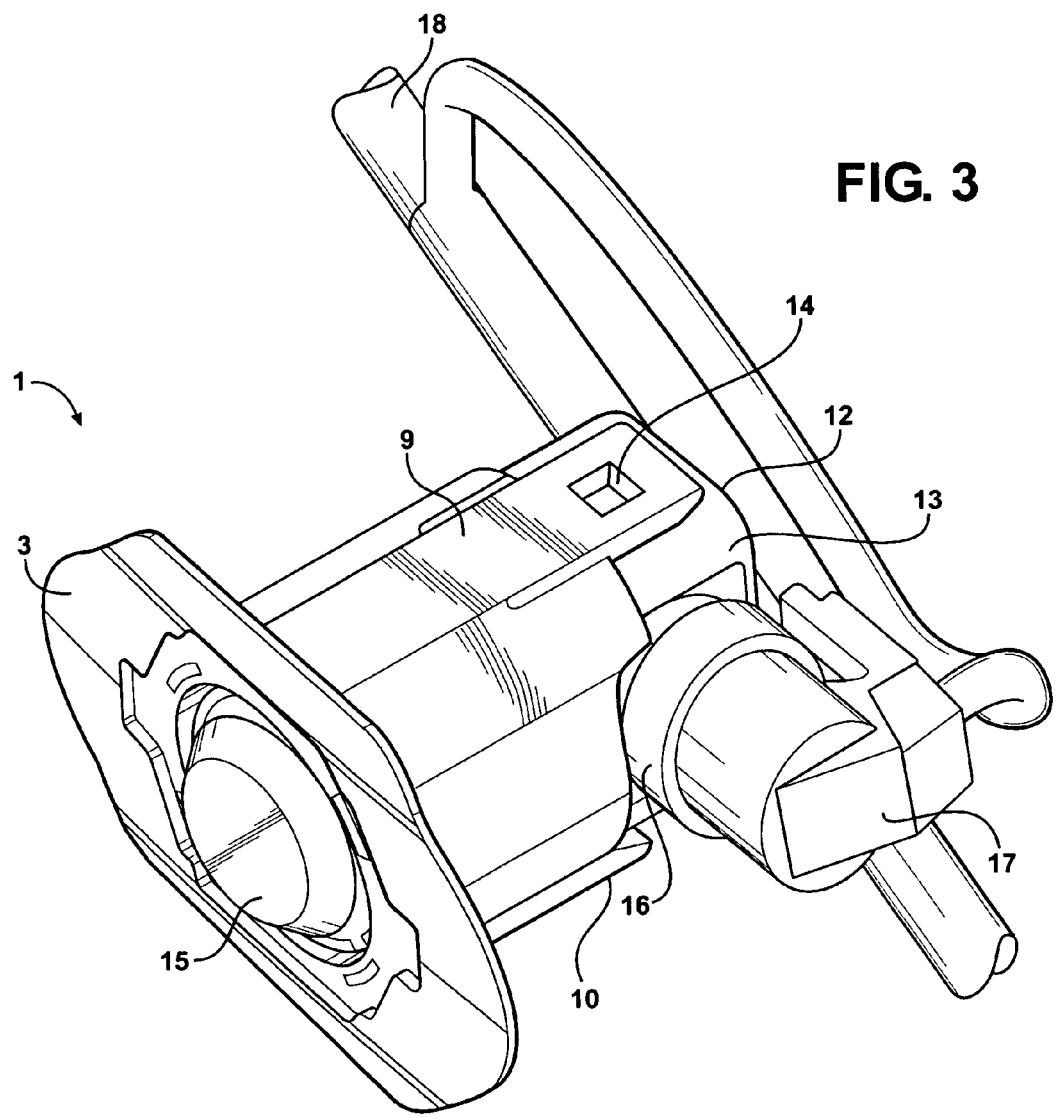
FIG. 3 is a perspective view of the retaining device with a sensor inserted therein.

The retaining device 1 is designed to accommodate the ultrasonic sensor in itself by means of the housing 6, shown in FIG. 3, and to be attached to a part of a vehicle body or the like, e.g., a bumper. The vehicle body part includes an opening at a location where the retaining device 1 is secured from the inside so that the ultrasonic sensor held by the retaining device 1 has its end face extending through the opening in the vehicle body part in order to generate the desired signals for measuring the distance from other objects.

The following is a detailed explanation of how the ultrasonic sensor is fixed to a vehicle body part by means of the retaining device 1.

The front end face 4 of the endplate 3 is first of all suitably secured to an inner surface of the vehicle body part in an area where there is an opening in the vehicle body part. For this purpose, an adhesive film of the like may be applied to the front end face 4 of the end plate 3 so that the endplate 3 is adhered to the inner surface of the body part by the front end face 4. Alternatively, the endplate 3 may be attached to the inner surface of the body part by welding, e.g., ultrasonic welding, if both the retaining device 1 and the body part are made of a thermoplastic material. When the front end face 4 of the endplate 3 is placed on the inner surface of the body part, the projection 8 on the additional member 2 moves into engagement with the opening formed in the body part itself. The projection 8 is matched in its outer contour to an edge portion of the opening in the body part. If the opening in the body part is circular, for example, a diameter of the projection 8 is slightly smaller than the diameter of the opening of the body part, so that the projection 8 can be inserted in the opening in the body part without jamming and at the same time the projection 8 is centrally accommodated within the opening in the body part. As the projection 8 is itself arranged centrally within the opening 5 in the endplate 3, as shown in FIG. 2, the engagement of the projection 8 in the opening in the body part as mentioned above ensures that the opening 5 in the endplate 3 is also centrally aligned relative to the opening in the body part. The thickness of the film hinge 7 by means of which the additional member 2 is disposed inside the opening 5 is sufficient so that the additional member ensures reliable centering during the process of fixing the endplate 3 to the inner surface of the body part.

When the retaining device 1 has been secured to the inner surface of the body part, with the opening 5 precisely aligned with the opening in the body part due to the additional member 2, the additional member 2 can be torn out of the opening 5 by inward application of force (in the direction indicated by an arrow A in FIG. 1) so that after the removal of the film hinge 7 the additional member 2 is able to drop backwards through the housing 6. Once the additional member 2 has been released, there is a free connection between the opening in the body part, the opening 5, and the interior of the housing 6. This allows an ultrasonic sensor 12 to be inserted in the open part of the housing 6 from behind.

Referring to FIG. 3, when the ultrasonic sensor 12 has been pushed far enough into the housing 6, the upper latching strip 9 and lower latching strip 10 engage with their latching surfaces 11 on associated latching lugs 14 formed on the body of the ultrasonic sensor 12 SO that the ultrasonic sensor 12 is suitably secured in the housing 6. In the secured position, a front part of the ultrasonic sensor 12 extends through the opening 5 so that an end face 15 of the ultrasonic sensor 12 can lie flush against an outer surface of the body part. A so-called release ring made of a flexible material such as silicon or the like is provided around an edge of the end face 15, bearing against an inner edge of the opening in the body part. The release ring ensures that the ultrasonic sensor 12 can start oscillating properly so that the desired signals can be generated for measuring the distance.

If a defect occurs in the ultrasonic sensor 12 or in the event of damage to the body part caused by a road accident or the like, the ultrasonic sensor 12 can easily be removed from the retaining device 1 by raising the upper 9 and lower 10 latching strips in order to replace the sensor 12 or replace the vehicle body part and still be able to use the part that remains intact.

As an alternative to the use of an ultrasonic sensor, it is also possible to incorporate any other type of the sensor in the retaining device 1 that is suitable for distance measurement into a radar sensor. The retaining device 1 according to the invention can also be used to mount other sensors, in which cost-effective and accurate mounting of the sensor on a component is of the essence.

Still referring to FIG. 3, the ultrasonic sensor 12 is inserted in the retaining device 1. The ultrasonic sensor 12 is inserted in the housing 6 from the open rear end thereof and has a body 13 that is accommodated in the housing 6 such that the latching lugs 14 formed on an upper and lower side of the body 13 latch with the upper 9 and lower 10 latching strips, respectively. In the latched position, the end face 15 of the ultrasonic sensor 12 extends through the opening 5 so that the end face 15 can sit flush against an outer surface of the vehicle body part (not shown). The diameter of the end face 15, which is visible from outside is slightly smaller that the diameter of the opening in the vehicle body part so as to provide a uniformly small facing between the edge of the end face 15 and the edge of the opening in the body part for a high quality finish.

In a lateral part of the body 13, the ultrasonic sensor 12 has a plug-in connection 16 through which a plug 17 of a data line 18 can be connected. This data connection is attached to an onboard computer of the motor vehicle. Thus, the signals generated by the ultrasonic sensor 12 can be transmitted to the onboard computer and hence to a distance warning system and be processed accordingly to, for example, generate signal tones.

The invention has been described in an illustrative manner. It is to be understood that the terminology, which has been used, is intended to be in the nature of words of description rather than of limitation. Many modifications and variations of the invention are possible in light of the above teachings. Therefore, within the scope of the appended claims, the invention may be practiced other than as specifically described.

What is claimed:

1. A retaining device for a sensor for mounting on a part having an opening, particularly on an outer part of a motor vehicle, said retaining device comprising:
   an endplate attachable to an inner surface of the part and having an opening;
   a housing adjacent to said endplate for receiving at least part of the sensor; and
   an additional member mounted to said endplate and having a projection extending through said opening in said endplate, said projection selectively received within the opening in the part to align said opening in said endplate with the opening in the part.

2. A retaining device as set forth in claim 1 including a releasable latching connection for securing the sensor in said housing.

3. A retaining device as set forth in claim 2 wherein at least one latching lug is formed on a body of the sensor, said latching lug engaging said latching connection when the sensor is secured in said housing.

4. A retaining device as set forth in claim 3 wherein the sensor is secured in the housing so that an end face of the sensor facing the part is substantially flush with an outer surface of the part.

5. A retaining device as set forth in claim 4 wherein an edge of an end face of the sensor facing the part, when the sensor is secured in the housing, is uniformly spaced from an edge of the opening in the part.

6. A retaining device as set forth in claim 5 wherein said additional member is removed once said endplate is attached to the part.

7. A retaining device as set forth in claim 6 which is integrally made from a plastic material.

8. A retaining device as set forth in claim 7 including at least one film hinge for mounting said additional member within said opening in said endplate.

9. A retaining device as set forth in claim 8 wherein said projection has a circular cross section to fit the opening in the part.

10. A retaining device as set forth in claim 9 wherein said projection is an annular strip.

11. A retaining device as set forth in claim 10 wherein said endplate is adhesively bonded to the part.

12. A retaining device as set forth in claim 10 wherein said endplate is welded to the part.

13. A method for attaching a sensor to a part with an opening utilizing a retaining device including a housing, an endplate having an opening, and an additional member secured to the endplate and having a projection extending through the opening in the endplate, the method comprising the steps of:

fixing the endplate to an inner surface of the part such that the projection of the additional member is received within the opening in the part to align the opening in the endplate with the opening in the part;

removing the additional member from the endplate;
inserting the sensor into the housing; and
fixing the sensor in the housing.

14. A method as set forth in claim 13 wherein the sensor is fixed in the housing such that an end face of the sensor facing the part is substantially flush with an outer surface of the part.

15. A method as set forth in claim 14 wherein the sensor is secured in the housing such that the edge of an end face of the sensor facing the part, once the sensor has been fixed in the housing, is at a uniform spacing from an edge of the opening in the part.

16. A method as set forth in claim 13 wherein the fixing of the endplate to the inner surface of the part comprises adhesive bonding.

17. A method as set forth in claim 13 wherein the fixing of the endplate to the inner surface of the part comprises welding.

18. A method for attaching a sensor to a part with an opening utilizing a retaining device, including a housing and an endplate having an opening, and an additional member having a projection, the method comprising the steps of:

securing the additional member to the endplate so that the projection extends through the opening in the endplate;

fixing the endplate to an inner surface of the part such that the projection of the additional member is received within the opening in the part to align the opening in the endplate with the opening in the part;

removing the additional member from the endplate;
inserting the sensor into the housing; and
fixing the sensor in the housing.

* * * * *